United States Patent
Husted et al.

(10) Patent No.: US 8,638,767 B2
(45) Date of Patent: Jan. 28, 2014

(54) MULTI-COMMUNICATION MODE PACKET ROUTING MECHANISM FOR WIRELESS COMMUNICATIONS SYSTEMS

(75) Inventors: Paul J. Husted, San Jose, CA (US); Manev Luthra, Santa Clara, CA (US); Seung Baek Yi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 13/026,580

(22) Filed: Feb. 14, 2011

(65) Prior Publication Data

US 2012/0207139 A1   Aug. 16, 2012

(51) Int. Cl.
*H04W 4/00* (2009.01)
*H04W 84/12* (2009.01)

(52) U.S. Cl.
CPC .................................... *H04W 84/12* (2013.01)
USPC ......................................... 370/338; 370/328

(58) Field of Classification Search
USPC ......................................................... 370/338
See application file for complete search history.

(56) References Cited

U.S. PATENT DOCUMENTS

| | | | | |
|---|---|---|---|---|
| 2002/0193099 A1* | 12/2002 | Paulsen | | 455/414 |
| 2004/0076134 A1* | 4/2004 | Barber et al. | | 370/338 |
| 2005/0135284 A1 | 6/2005 | Nanda et al. | | |
| 2005/0265303 A1 | 12/2005 | Edwards et al. | | |
| 2006/0062187 A1* | 3/2006 | Rune | | 370/338 |
| 2007/0253499 A1 | 11/2007 | Waters et al. | | |
| 2007/0263600 A1* | 11/2007 | Sutardja et al. | | 370/352 |
| 2009/0141691 A1 | 6/2009 | Jain | | |
| 2009/0323608 A1* | 12/2009 | Adachi et al. | | 370/329 |

FOREIGN PATENT DOCUMENTS

| | | |
|---|---|---|
| EP | 1548958 A2 | 6/2005 |
| EP | 1566944 | 8/2005 |
| EP | 2224614 A1 | 9/2010 |
| WO | 2012112466 | 8/2012 |

OTHER PUBLICATIONS

IEEE 802.11n Standard. Institute of Electrical and Electronic Engineers. Oct. 2009.*
International Search Report and Written Opinion—PCT/US2012/024928—ISA/EPO—May 16, 2012, 13 pages.
"PCT Application No. PCT/US2012/024928 Written Opinion of the IPEA", Mar. 1, 2013 , 7 pages.
"PCT Application No. PCT/US2012/024928 International Preliminary Report on Patentability", May 29, 2013 , 8 pages.

* cited by examiner

*Primary Examiner* — Jason Mattis
*Assistant Examiner* — Stephen J Clawson
(74) *Attorney, Agent, or Firm* — DeLizio Gilliam, PLLC

(57) ABSTRACT

The transmission range of a network communication device can be extended by enabling transition between legacy and non-legacy communication protocols. A communication device can receive a packet in a legacy packet format from a host device via a legacy network interface. In response to determining that the packet received via the legacy network interface is to be transmitted using one of a plurality of non-legacy communication protocols, a processing path within the communication device in accordance with which to process the packet for transmission using the non-legacy communication protocol is determined. The packet in the legacy packet format is reformatted to yield a target packet in a non-legacy packet format based, at least in part, on the non-legacy communication protocol. The target packet is provided to the destination network device in accordance with the non-legacy communication protocol.

31 Claims, 7 Drawing Sheets

MULTI-COMMUNICATION MODE PACKET ROUTING MECHANISM FOR WIRELESS COMMUNICATIONS SYSTEMS

BACKGROUND

Embodiments of the inventive subject matter generally relate to the field of wireless communication networks and, more particularly, to a multi-communication mode packet routing mechanism for wireless communication systems.

Wireless communication systems can use one or more communication channels to transfer data between a transmitter and a receiver. These communication systems can operate according to a set of standards, defined by the Institute of Electrical and Electronics Engineers (IEEE) 802.11 committee, for Wireless Local Area Network (WLAN) communication. 802.11b is a part of the IEEE 802.11 specification and is a legacy wireless communication standard that enables data transfers, between the transmitter and the receiver, at speeds of 1 Mbps 2 Mbps.

SUMMARY

Various embodiments of a multi-communication mode packet routing mechanism for wireless communication systems are disclosed. In one embodiment, a packet in a legacy packet format is received at a network communication device from a host device via a legacy network interface for transmission to a destination network device. It is determined whether the packet received at the network communication device via the legacy network interface is to be transmitted using a legacy communication protocol or a non-legacy communication protocol of a plurality of non-legacy communication protocols based, at least in part, on an operational mode of the host device. In response to determining the packet is to be transmitted using the non-legacy communication protocol, a processing path within the network communication device in accordance with which to process the packet for transmission using the non-legacy communication protocol is determined. The packet in the legacy packet format is reformatted to yield a target packet in a non-legacy packet format based, at least in part, on the non-legacy communication protocol. The target packet is provided to the destination network device in accordance with the non-legacy communication protocol.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
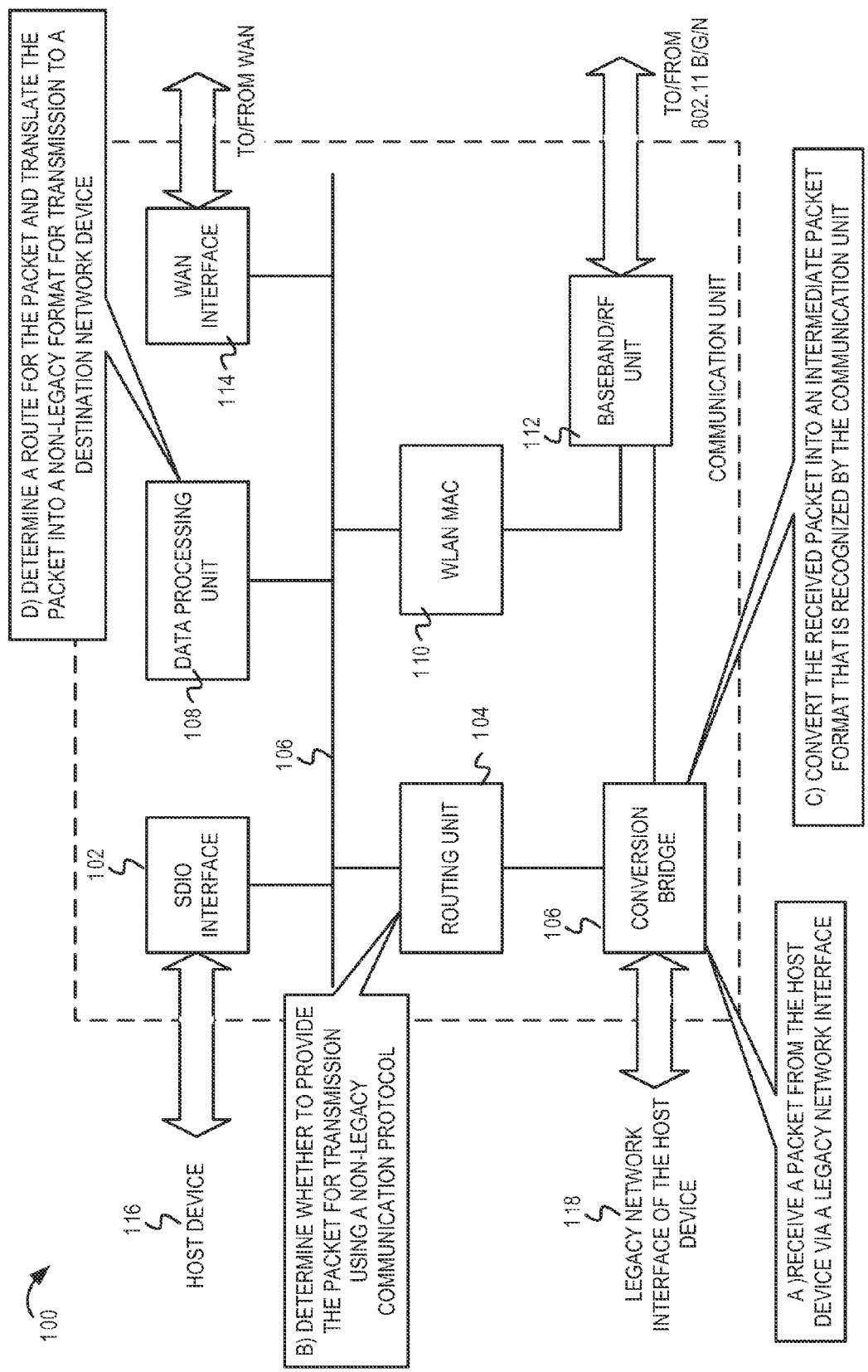
FIG. 1 is an example block diagram illustrating operations for exchanging data between communication interfaces with different data rates.

The description that follows includes exemplary systems, methods, techniques, instruction sequences, and computer program products that embody techniques of the present inventive subject matter. However, it is understood that the described embodiments may be practiced without these specific details. For instance, although examples refer to routing and processing packets from a legacy network interface and transmitting the packets using an 802.11g/n communication protocol or a wireless wide area network (WWAN) communication protocol, embodiments are not so limited. In other embodiments, the packets from the legacy network interface can be converted to any suitable non-legacy format and can be transmitted using any suitable non-legacy communication technology (e.g., Long range Wi-Fi, etc.) and using any suitable non-legacy communication protocols (e.g., Worldwide Interoperability for Microwave Access (WiMAX), etc.). In other instances, well-known instruction instances, protocols, structures, and techniques have not been shown in detail in order not to obfuscate the description.

Legacy wireless local area network (WLAN) devices (e.g., 802.11 or 802.11b devices) typically transmit packets at slower data rates (e.g., 1 Mbps-2 Mbps) as compared to "advanced" or "modern" non-legacy WLAN devices (e.g., which can typically transmit at data rates of 54 Mbps in the case of 802.11g devices or 65 Mbps in the case of 802.11n devices). Therefore, the legacy WLAN devices may transmit (i.e., be "on the air") for a longer time interval, may not efficiently utilize the available bandwidth and network capacity, and may consume a larger amount of power.

An intermediate conversion unit can ensure seamless transition between legacy communication protocols and non-legacy communication protocols to extend a transmission range of a legacy network interface supported by a host device. In some embodiments, packets from the host device can be provided to a non-legacy network device via the legacy network interface for routing and conversion and transmission using the non-legacy communication protocols. The intermediate conversion unit (e.g., or the non-legacy network device) can transmit packets from the legacy network interface using appropriate supported non-legacy communication protocols (e.g., a WWAN communication protocols, a WLAN 802.11g/n communication protocols, etc.) using a common WLAN infrastructure-mode connectivity model. The intermediate conversion unit can intercept packets transmitted from the legacy network interface and can identify a route and a non-legacy communication protocol in accordance with which to transmit the packets to a destination network device. The intermediate conversion unit can translate/reformat the packets from a legacy packet format into an appropriate non-legacy packet format in accordance with the identified non-legacy communication protocol. The intermediate conversion unit can intercept and route the packets from the legacy network interface using the non-legacy communication protocol at faster transmission rates (without the knowledge of the host device). Such a technique for conversion between legacy communication protocols and non-legacy communication protocols can enable packets from the legacy network interface to be transmitted at faster speeds (e.g., at higher data-rates and/or by implementing advanced modulation schemes), thus improving the rate-over-range. This can increase the capacity of the communication network, decrease transmission time, and free up the communication medium. Consequently, this can decrease power consumption, conserve batter power, and extend transmission range. Furthermore, in transmitting packets from the legacy network interface using non-legacy communication protocols, advanced security protocols can also be implemented for improved data security and encryption. This can enable network-agnostic applications, software, and communications (e.g., internet access services) to be provided to the host device via the legacy network interface.

FIG. 1 is an example block diagram illustrating operations for exchanging data between communication interfaces with different data rates. FIG. 1 depicts a communication unit 100. The communication unit 100 comprises a secure digital input output (SDIO) interface 102, a data processing unit 108, a wireless wide area network (WWAN) interface 114, a routing unit 104, a conversion bridge 106, a wireless local area network (WLAN) medium access control (MAC) unit 110, and a baseband/RF unit 112. The SDIO interface 102, the data processing unit 108, the WWAN interface 114, the routing unit 104, and the WLAN MAC 110 are connected to a bus 116. The conversion bridge 106 is coupled to the routing unit 104 and to the baseband unit 112. The WLAN MAC 110 is coupled to the baseband unit 112. The WWAN interface 114 enables the communication unit 100 to communicate using a WWAN communication protocol (e.g., General packet radio service (GPRS), Global System for Mobile Communications (GSM), 3G, etc.). The baseband/RF unit 112 enables the communication unit 100 to communicate via a WLAN communication protocol (e.g., 802.11b/g/n communication protocols). As depicted in FIG. 1, the communication unit 100 implements two network interfaces to the host device 116— the SDK) interface 102 and the legacy network interface 118. When the host device 106 is in a non-legacy operational mode, the host device 116 may use the SDK) interface 102 for applications that require high throughput, strong security, and other advanced features. When the host device 106 is in one of a plurality of legacy operational modes, the communication unit 100 can be used for transmitting packets received via the legacy network interface 118 using 802.11b (or other legacy WLAN communication protocols), 802.11g/n (or other non-legacy WLAN communication protocols), or WWAN communication protocols (e.g., GPRS, GSM, 3G, 4G), depending on the operational mode and/or packets received at the communication unit 100. In some embodiments, to determine how to route and process packets, the communication unit 100 can implement functionality to intercept or inject packets (e.g., MAC frames) received from the legacy network interface 118. As will be described below in stages A-C, the communication unit 100 can route and process data received over the legacy network interface 118 to enable the data to be transmitted over a communication network at higher data-rates and/or by implementing advanced modulation schemes using a non-legacy communication protocol.

At stage A, the conversion bridge 106 receives a packet from the host device via the legacy network interface 118. The conversion bridge 106 can be a bridge between the legacy network interface 118 and other processing components of the communication unit 100, in one example, the legacy network interface 118 can be an interface coupled to the host device 116 that supports an 802.11b legacy communication protocol (and/or other suitable legacy communication protocols). As depicted in FIG. 1, the legacy network interface 118 is coupled to the communication unit 100. The communication unit 100 can process and route the packet using an appropriate non-legacy communication protocol (e.g., 802.11g/n, WWAN, long range Wi-Fi, WiMAX, etc.). The conversion bridge 106 in conjunction with the routing unit 104 can determine whether to translate the packet received from the legacy network interface 118 into a suitable format for transmission using the non-legacy communication protocol.

In some implementations, on determining that the host device is scheduled to communicate via the legacy network interface, the conversion bridge 106 can route the packet directly to the baseband processing unit 112 for transmission using a legacy communication protocol. Alternately, on determining that the packet received from the host device can be transmitted using the non-legacy communication protocols, the conversion bridge 106 can (in conjunction with the routing unit 104, the data processing unit 108, and the WLAN MAC 110) convert the packet into a non-legacy format and then provide the packet to the baseband processing unit 112 for transmission using one of the non-legacy communication protocols, as will be further described below.

At stage B, the routing unit 104 determines whether to provide the packet for transmission using the non-legacy communication protocol (e.g., WWAN, 802.11g/n network, etc.). The routing unit 104 can sniff the packet received from the legacy network interface 118 and can determine whether the packet can be transmitted using the non-legacy communication protocol. In one implementation, the routing unit 104 can determine whether the packet can be transmitted using the non-legacy communication protocol based on an operating mode of the host device 116. For example, the routing unit 104 may determine that packets received from the legacy network interface 118 when the host device in a voice communication mode should be transmitted using the non-legacy communication protocol. As another example, for a gaming device, the routing unit 104 may determine that packets received from the legacy network interface 118 when the gaming device is in a legacy gaming mode should not be transmitted using the non-legacy communication protocol, and instead should be transmitted using a legacy communication protocol (e.g., 802.11b), as will be further described below. In another implementation, the routing unit 104 can determine whether the packet received from the legacy network interface 118 can be transmitted using the non-legacy communication protocol based on an indication (e.g., a network address or supported communication protocols) of a destination network device. For example, the routing unit 104 can snoop MAC frames transmitted by the legacy network interface 118 to identify the destination network device with which the host device 116 is scheduled to communicate. On determining that the packet can be transmitted to the destination network device using the non-legacy communication protocols, the routing unit 104 can cause the conversion bridge 106 to convert the packet from a legacy packet format into an intermediate packet formats, as will be described below in stage C. The routing unit 104 can also intercept subsequent packets from the legacy network interface 118 and provide the packets for subsequent processing (e.g., by the data processing unit 108) and transmission using the non-legacy communication protocol.

At stage C, after determining to transmit the packet using the non-legacy communication protocol, the conversion bridge 106 converts the packet from the legacy packet format to the intermediate packet format that is recognized by the communication unit 100. The legacy network interface 118 and the communication unit 100 may transmit packets at different data rates, use different signaling techniques, require data to be transmitted in different packet formats, etc, as will be described with reference to FIGS. 2-3. The conversion bridge 106 enables the packet received from the legacy network interface 118 to be transmitted at higher speeds (e.g., at higher data rates using faster non-legacy communication protocols such as 802.11g/n) instead of being transmitted at lower speeds (e.g., at slower data rates using slower legacy communication protocols such as 802.11b). In some implementations, the packet received via the legacy network interface 118 may be converted for transmission using the non-legacy communication protocols to enable access to WLAN networks with better security and/or for access to WWAN networks (e.g., if WLAN networks are not available). The conversion bridge 106 can convert the packet received from the legacy network interface 118 in the legacy packet format to the intermediate packet format that is recognized by the communication unit 100 (e.g., the routing unit 104, the data processing unit 108, etc.). In one example, the conversion bridge 106 can convert a Physical Layer Convergence Procedure (PLCP) header from a legacy PLCP header format to an intermediate PLCP header format. In another example, the conversion bridge 106 can convert other headers and data fields of the packet from the legacy format to the intermediate non-legacy format. The routing unit 104 can then provide the packet in the intermediate packet format to the data processing unit 108. As will be described below with reference to stage D, the data processing unit 108 can then determine how to route the packet and which non-legacy communication protocol should be used for transmitting the packet (e.g., 802.11n, WWAN, etc.) to the destination network device. The data processing unit 108 can then convert the packet from the intermediate packet format into a non-legacy packet format that corresponds to the selected non-legacy communication protocol.

At stage D, the data processing unit 108 determines a routs for the packet and translates the packet into a non-legacy packet format (e.g., a WWAN packet format or an 802.11g/n packet format) for transmission to the destination network device. The data processing unit 108 can analyze the packet and determine the destination network device to which the packet is to be provided. The data processing unit 108 can, based on an address of the destination network device (or based on communication protocols supported at the destination network device), determine a route according to which the packet is to be transmitted from the host device (i.e., the communication unit 100) to the destination network device. The data processing unit 108 can also determine a suitable non-legacy communication protocol in accordance with which to transmit the packet to the destination network device based on an operational mode of the host device. In one example, the processing unit 108 can determine whether the packet provided from the legacy network interface 118 should be transmitted using the non-legacy WLAN communication protocol or the WWAN communication protocol. Once the data processing unit 108 selects the non-legacy communication protocol, the data processing unit 108 can translate the packet into an appropriate non-legacy packet format for transmission using the selected non-legacy communication protocol, For example, the processing unit 108 can translate the packet from the intermediate packet format into a non-legacy WLAN packet format (or a WWAN packet format) depending on whether the packet will be transmitted using the non-legacy WLAN communication protocol (or the WWAN communication protocol). For example, the data processing unit 108 can cause the packet provided from the legacy network interface 118 to be encapsulated in an Ethernet header, a sub-network access protocol (SNAP) header, or other suitable non-legacy communication protocol headers.

Although not described in FIG. 1, the communication unit 100 can also receive data from legacy and non-legacy devices, process the data, and provide the data to the host device 116. For example, the WWAN interface 114 or the baseband/RF unit 112 can receive data, process the data (along with other components of the communication unit 100), and provide the data to the host device 116. Furthermore, it is noted that if the routing unit 104 determines that the packets received via the legacy network interface 118 should not be transmitted using the non-legacy communication protocol, the routing unit 104 can prevent the conversion bridge 106 from converting the packets to the intermediate packet format. The routing unit 104 may not intercept subsequent packets and can cause the conversion bridge 106 to provide the packets received via the legacy network interface 118 (without conversion) to the baseband unit 112 for transmission using a legacy communication protocol (e.g., 802.11b) at legacy data rates (e.g., 1 Mbps-2 Mbps).

Figure 2:
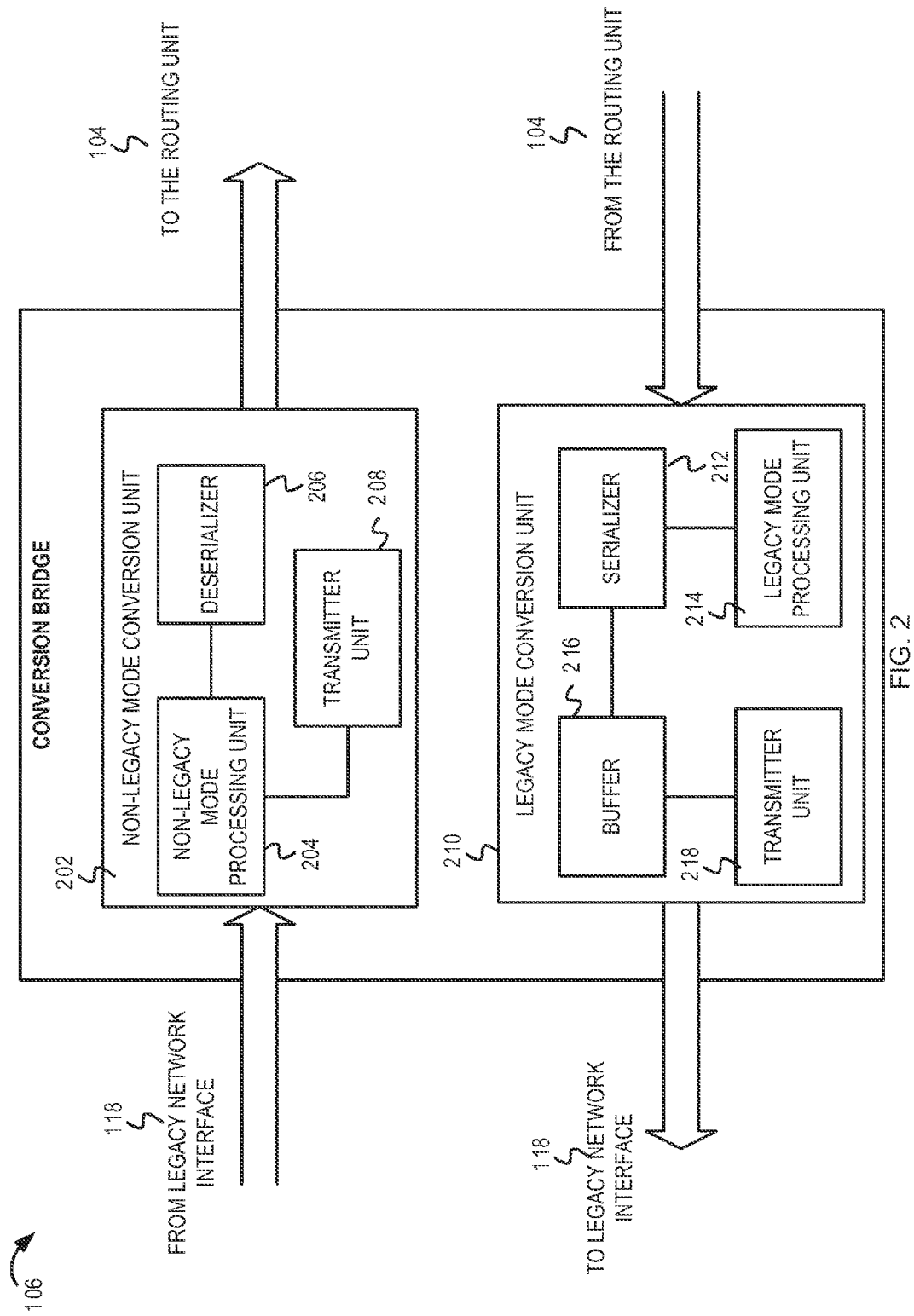
FIG. 2 is a block diagram illustrating example architecture of a conversion bridge.

FIG. 2 is a block diagram illustrating example architecture of the conversion bridge 106. The conversion bridge 106 comprises a non-legacy mode conversion unit 202 and a legacy mode conversion unit 210. The non-legacy mode conversion unit 202 can convert packets received from a legacy network interface 118 and can provide the converted packets for transmission to the routing unit 104 and other components of the communication unit 100 (and ultimately via a communication network using a non-legacy communication protocol). The non-legacy mode conversion unit 202 comprises a non-legacy mode processing unit 204, a deserializer 206, and a transmitter unit 208. The legacy mode conversion unit 210 can convert packets received from the routing unit 104 (via the other components of the communication unit 100) and can provide the converted packets to the legacy network interface 118. The legacy mode conversion unit 210 comprises a legacy mode processing unit 214, a serializer 212, a buffer 216, and a transmitter unit 218.

Figure 3:
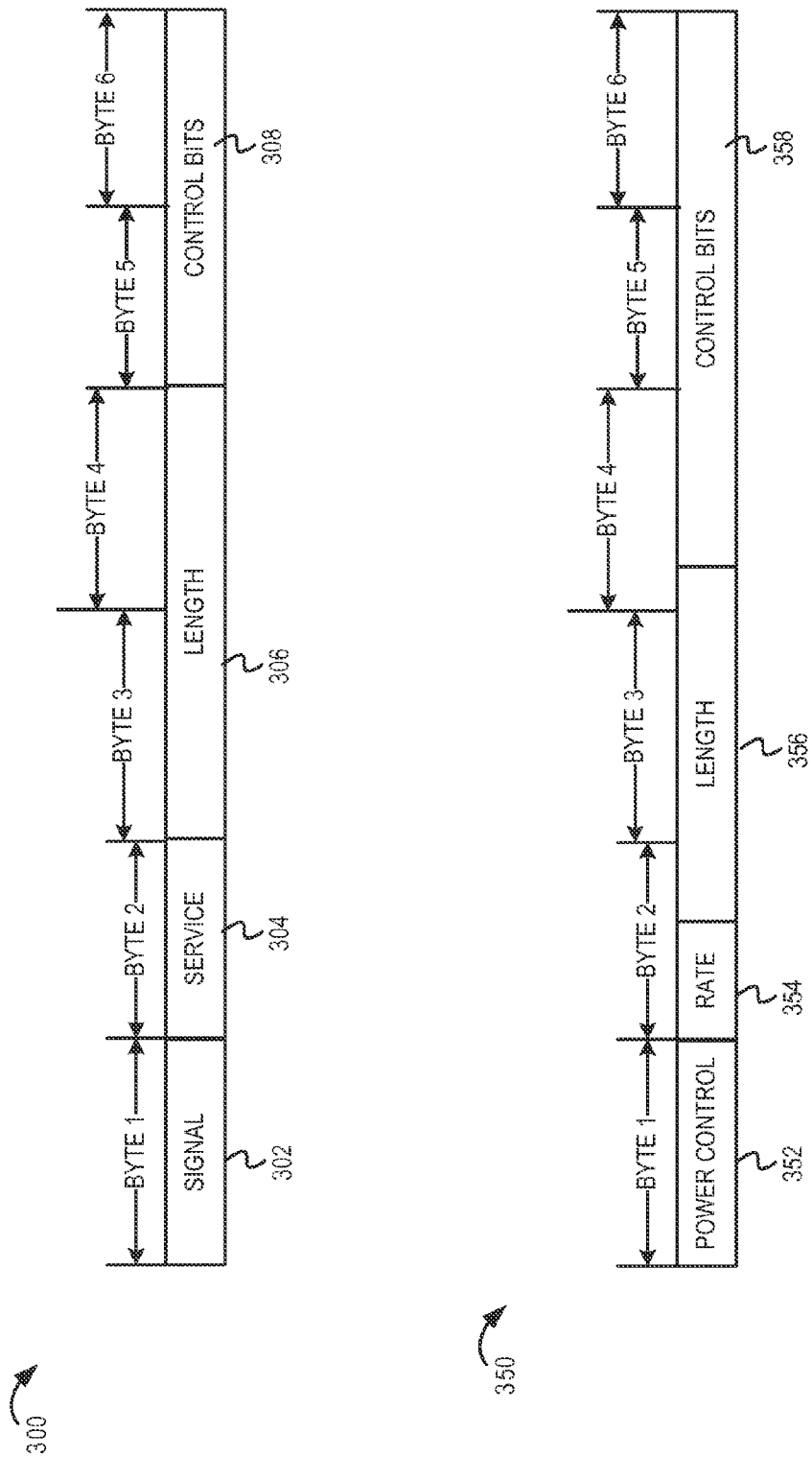
FIG. 3 is an example block diagram illustrating an example legacy PLCP header format and an example intermediate PLCP header format.

The conversion bridge 106 receives a packet in a legacy packet format from the legacy network interface 118. In one example, the conversion bridge 106 can receive an indication (e.g., a control signal) that a packet in the legacy packet format is available for transmission. In response to the control signal, the non-legacy mode processing unit 204 of the non-legacy mode conversion unit 202 can begin to receive a PLCP header of the packet from the legacy network interface 118. PLCP header format 300 of FIG. 3 depicts an example legacy PLCP header format of the packet received from the legacy network interface 118. As depicted in FIG. 3, the legacy PLCP header 300 can comprise a signal field 302, a service field 304, a length field 306, and control bits 308. The signal field 302 can indicate one or more characteristics of the data received from the legacy network interface 118. For example, the signal field 302 can indicate a modulation scheme of the data received from the legacy network interface 118. In one implementation, the signal field 302 can comprise a value of 0x0A to indicate a 1 Mbps data transmit rate (i.e., a differential binary phase shift keying (DBPSK) modulation scheme). The signal field 302 can comprise a value of 0x0B to indicate a 2 Mbps data transmit rate (i.e., a differential quadrature phase shift keying (DQPSK) modulation scheme). The length field 306 can indicate the transmit length (in microseconds) of the packet received from the legacy network device 118. In one example, the transmit length can be calculated to exclude the length of the legacy PLCP header. In another example, the transmit length can be calculated to include the length of the legacy PLCP header. The control bits 308 can indicate preamble information (e.g., whether the packet comprises a short preamble or a long preamble), RF attenuator settings, AGC settings, signal quality information, etc. In one example, one byte (i.e., 8 bits) can be allocated for the signal field 302, one byte can be allocated for the service field 304, two bytes (i.e., 16 bits) can be allocated for the length field 306, and two bytes can be allocated for the control bits 308. It is noted that in other implementations, the legacy PLCP header format 300 can comprise any suitable number of fields and each field can be allocated any suitable number of bits.

The non-legacy mode processing unit 204 can convert the received legacy PLCP header 300 into an intermediate PLCP header format 350 of FIG. 3 that is recognized by the components of the communication unit 100 (e.g., the routing unit 104 and the data processing unit 108). The intermediate PLCP header format 350 can comprise a power control field 352, a rate field 354, a length field 356, and other control bits 358. The power control field 352 can indicate a type of transmitter power control (TPC) being implemented and a corresponding transmit power at which the packet is being transmitted. The rate field 354 can indicate a transmit rate of the legacy network interface 118. For example, the rate field 354 can comprise a value of 0x1A to indicate a 2 Mbps data transmit rate, a value of 0x1B to indicate a 1 Mbps data transmit rate, etc. The length field 356 can indicate the transmit length (in bytes) of the packet being transmitted. In one example, 8 bits can be allocated for the power control field 352, 5 bits can be allocated for the rate field 354, and 12 bits can be allocated for the length field 356. It is noted that in other implementations, the intermediates PLCP header format 350 can comprise any suitable number of fields and each field can be allocated any suitable number of bits.

Referring back to FIG. 2, on determining that the legacy network interface 118 is ready to transmit data, the non-legacy mode processing unit 204 can start a PLCP clock and can start latching data on a falling edge of the clock. In one example, the PLCP clock can be a 1 MHz clock with a ⅓ duty cycle. The non-legacy mode processing unit 204 can receive the PLCP header from the legacy network interface 118 in the legacy PLCP header format 300. The non-legacy mode processing unit 204 can convert the legacy PLCP header format 300 into the intermediate PLCP header format 350. The non-legacy mode processing unit 204 can cause the transmitter unit 208 to transmit (in a parallel format i.e., in bytes) the PLCP header in the intermediate PLCP header format 350 to the data processing unit 108 (via the routing unit 104).

After the non-legacy mode processing unit 204 receives, converts, and transmits the PLCP header, the non-legacy mode processing unit 204 can receive subsequent fields of the packet (e.g., the preamble, payload, etc.). In one example, the non-legacy mode processing unit 204 can transmit an indication (e.g., a control signal) to the legacy network interface 118 that the PLCP header has been transmitted and that the non-legacy mode processing unit 204 is ready to receive subsequent fields of the packet (e.g., the preamble, payload, etc.). To receive the subsequent fields of the packet, the non-legacy mode processing unit 204 can update the frequency of the clock (if needed) based on the value received in the signal field 302 of the legacy PLCP header 300. For example, if the signal field 302 indicates that the subsequent fields of the packet will be transmitted at 2 Mbps, the non-legacy mode processing unit 204 can ensure that the frequency of the clock is at 2 Mbps. The non-legacy mode processing unit 204 can start latching data on the falling edge of the clock. Data received from the legacy network interface 118 may be in a serial data format (i.e., the conversion bridge 106 may receive the data from the legacy network interface 118 on a bit-by-bit basis). Therefore, the non-legacy mode processing unit 204 can provide the serial data received from the legacy network interface 118 to the deserializer 206. The deserializer 206 can convert the data (e.g., the payload and the non-PLCP data fields) received from the legacy network interface 118 into the parallel format (e.g., in bytes). The transmitter unit 208 can transmit these data bytes to the routing unit 104.

It is noted that in one implementation, the non-legacy mode processing unit 204 may only modify the PLCP header (but not the payload or other non-PLCP fields) of the packet received from the legacy network interface 118. In one implementation, the non-legacy mode processing unit 204 can provide the serial data received from the legacy network interface 118 to the deserializer 206, receive the parallel data generated by the deserializer 206 (generated from the serial data), append the intermediate PLCP header 350, and generate a packet in an intermediate packet format recognized by components of the communication unit 100. The transmitter unit 208 can transmit the packet in the intermediate packet format to the routing unit 104 of FIG. 1.

The legacy mode conversion unit 210 can convert packets received from the routing unit 104 (and the data processing unit 108) into a legacy packet format that is recognized by the legacy network interface 118 (and/or the host device 116). When data is available for the legacy network interface 118 at the routing unit 104, the legacy mode processing unit 214 can begin to receive the PLCP header in the intermediate PLCP header format 350 from the routing unit 104 (or the data processing unit 108). The legacy mode processing unit 214 can convert the PLCP header from the intermediate PLCP header format 350 to the legacy PLCP header format 300. The transmitter unit 218 can transmit the PLCP header in the legacy PLCP header format 300 to the legacy network interface 118. In one example, the legacy mode processing unit 214 can start a clock and the transmitter unit 218 can launch the PLCP header on a failing edge of the clock.

After the PLCP header has been transmitted, the legacy mode processing unit 214 can receive the remainder of the packet (e.g., the preamble, the payload and other non-PLCP fields) from the routing unit 104 and can begin to transmit the remainder of the packet of the legacy network interface 118. As described above, the legacy mode processing unit 214 may modify the frequency of the clock depending on the preamble length and data rate expected by the legacy network interface 118. In one example, the routing unit 104 can provide parallel data (e.g., in bytes) to the legacy mode processing unit 214 while the legacy network interface 118 may expect to receive serial data (e.g., in bits). Therefore, the legacy mode processing unit 214 can store the parallel data received from the routing unit 104 in the buffer 216 (e.g., a first in first out (FIFO) queue). The serializer 212 can access the parallel data from the buffer 216 and can serialize the data so that the least significant bit (LSB) is transmitted to the legacy network interface 118 as the first bit. The transmitter unit 218 can then transmit the serial data to the legacy network interface 118.

Figure 4:
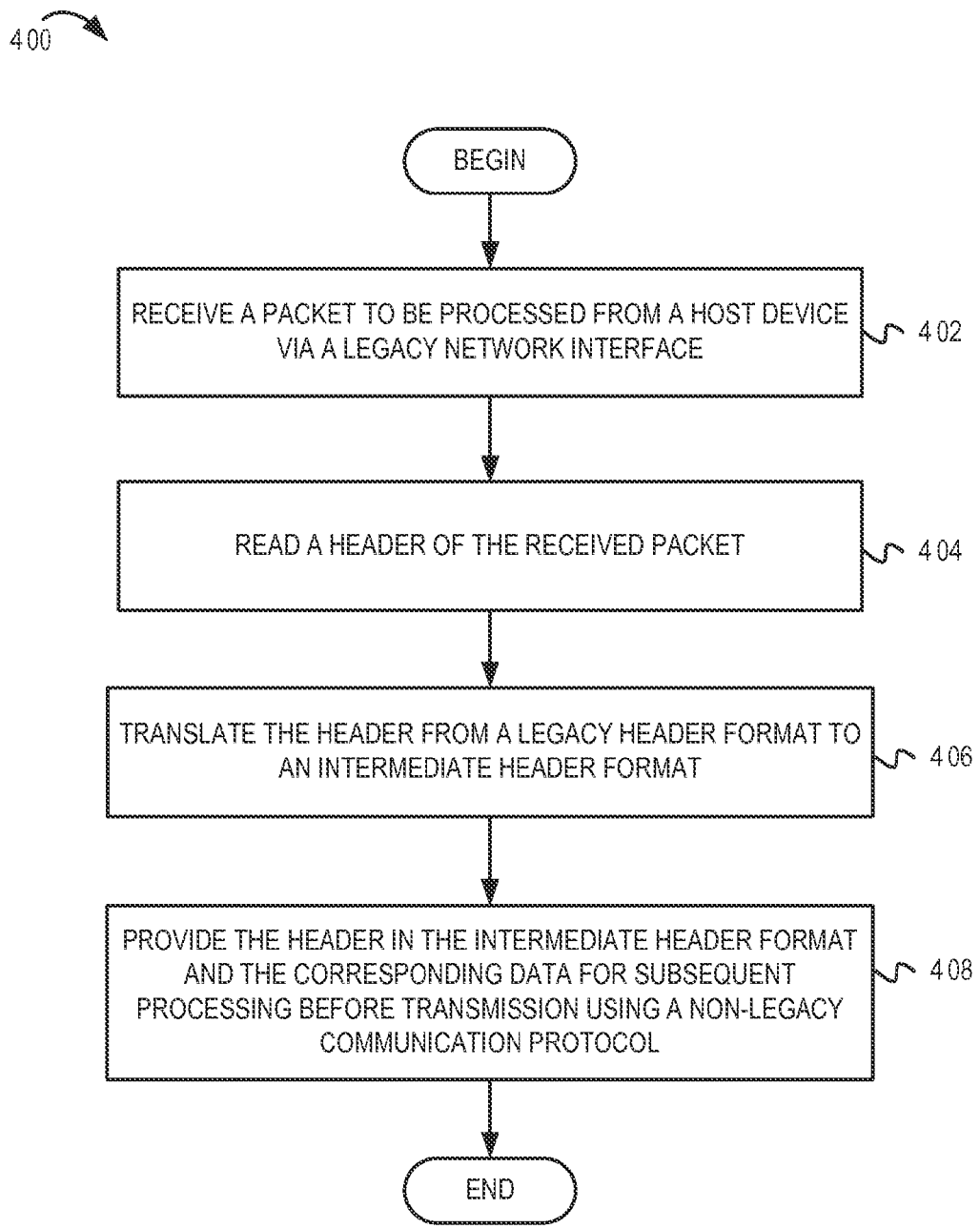
FIG. 4 is a flow diagram illustrating example operations for formatting a packet received from a legacy network interface for transmission using a non-legacy communication protocol.

FIG. 4 is a flow diagram ("flow") 400 illustrating example operations for formatting a packet received from a legacy network interface for transmission using a non-legacy communication protocol. The flow 400 begins at block 402.

At block 402, a packet is received from a host device via a legacy network interface. For example, with reference to FIG. 2, the conversion bridge 106 can receive the packet from the host device via the legacy network interface 118. On receiving the packet from the legacy network interface 118, the conversion bridge 106 in conjunction with the routing unit 104 can determine whether the packet should be transmitted using a non-legacy communication protocol. In one implementation, the host device may support multiple communication modes. Depending on the communication mode in which the host device is operating, the packet may or may not be transmitted using the non-legacy communication protocol. For example, the routing unit 104 may determine that packets received from the legacy network interface 118 when the host device in a voice communication mode should be transmitted using a suitable non-legacy communication protocol. As another example, if the host device is operating in a legacy mode, the conversion bridge 106 in conjunction with the routing unit 104 can determine not to transmit the packet using the non-legacy communication protocol (and to instead use the legacy communication protocol). The flow continues at block 404.

Figure 5:
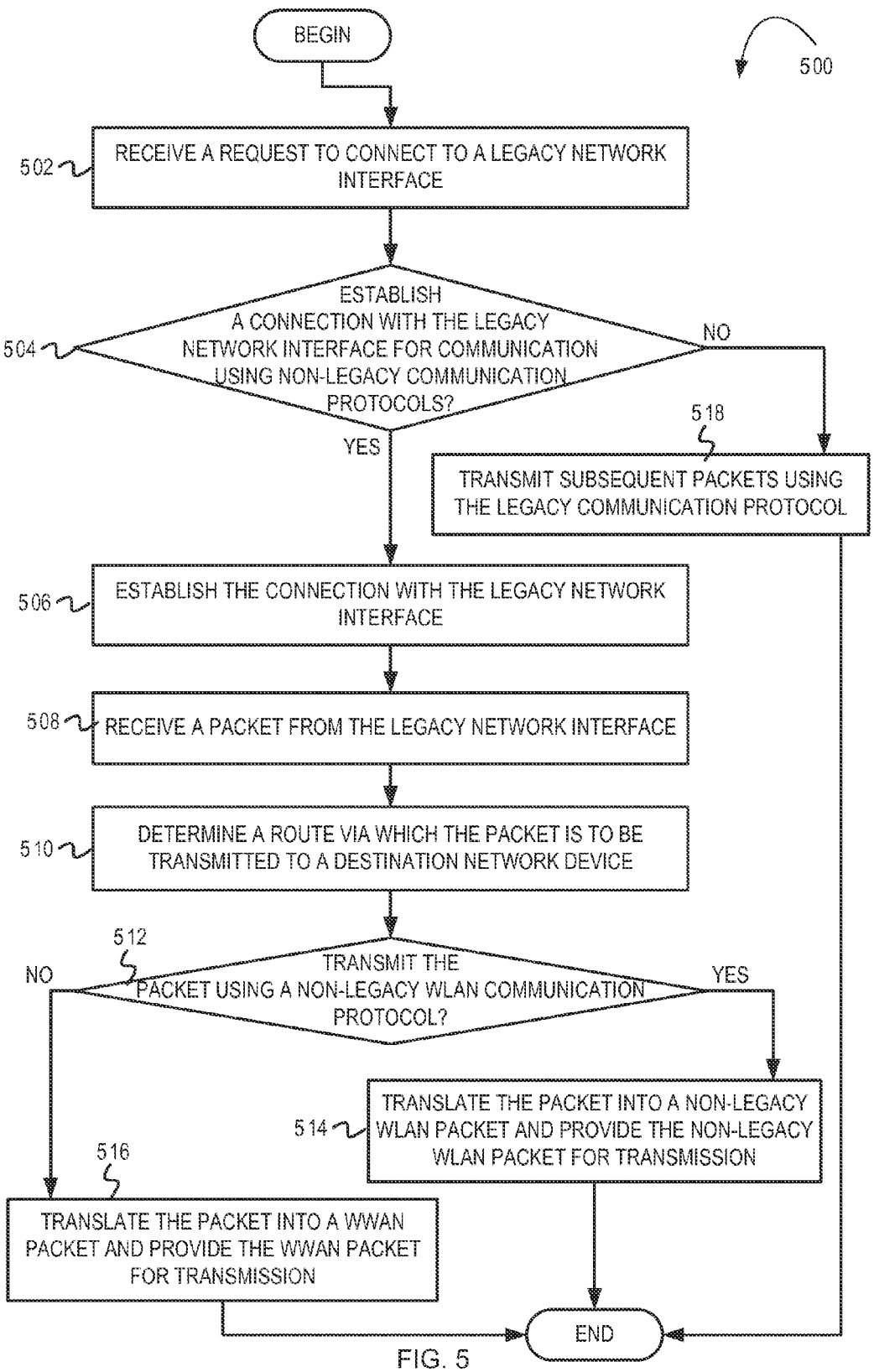
FIG. 5 is a flow diagram illustrating example operations for transmitting a packet received from a legacy network interface using a non-legacy communication protocol.

At block 404, a header of the received packet is read. For example, the non-legacy mode conversion unit 202 of the conversion bridge 106 can read the PLCP header of the packet received at block 402, in one example, the PLCP header of the packet received from the legacy network interface 118 can be in a legacy PLCP header format 300 of FIG. 3. The PLCP header may also be received from the legacy network interface 118 in a serial format. In one implementation, based on the PLCP header, the non-legacy mode conversion unit 202 may determine whether the PLCP header and subsequent data received from the legacy network interface 118 is to be provided to another legacy network device using a legacy communication protocol. If so, the non-legacy mode conversion unit 202 can directly provide the PLCD header and the subsequent data to the baseband unit 112 for transmission using the legacy communication protocol. Otherwise, as depicted in FIG. 4 and FIG. 5, the PLCP header and subsequent data received from the legacy network interface 118 is reformatted for transmission using a non-legacy communication protocol. The flow continues at block 406.

At block 406, the header is translated from a legacy header format to an intermediate header format. For example, the non-legacy mode conversion unit 202 can convert the PLCP header from the legacy PLCP header format 300 into the intermediate PLCP header format 350. In one implementation, the inter imediate PLCP header format 350 may be a predetermined PLCP header format that is recognized by components of the communication unit 100 (e.g., the conversion bridge 106, the routing unit 104, the data processing unit 108, etc.). In another implementation, other non-legacy network devices (e.g., WLAN devices, WWAN devices, etc.) may also recognize the intermediate PLCP header format 350. Additionally, in some implementations, the non-legacy mode conversion unit 202 can also convert serial data received from the legacy network interface 118 into corresponding parallel data. The flow continues at block 408.

At block 408, the header in the intermediate header format and the corresponding data are provided for subsequent processing before transmission using a non-legacy communication protocol. For example, the non-legacy mode conversion unit 202 can transmit the PLCP header in the intermediate PLCP header format 350 and the corresponding data (determined at block 406) to the routing unit 104. In one implementation, the non-legacy mode conversion unit 202 can first provide the PLCP header in the intermediate PLCP header format 350 to the routing unit 104. In another implementation, the non-legacy mode conversion unit 202 can simultaneously provide the PLCP header in the intermediate PLCP header format 350 and the corresponding data to the routing unit 104. As described above with reference to FIGS. 1 and 2, the routing unit 104 can provide the PLCP header in the intermediate PLCP header format 350 and the corresponding data to the data processing unit 108. As will be described with reference to FIG. 5, the data processing unit 108 can determine how (and in accordance with which non-legacy communication protocol) to transmit the data to the destination network device and can further modify the data for transmission using an appropriate non-legacy communication protocol. From block 408, the flow ends.

FIG. 5 is a flow diagram 500 illustrating example operations for transmitting a packet received from a legacy network interface using a non-legacy communication protocol. The flow 500 begins at the block 502.

At block 502, a request to connect to a legacy network interface is received. For example, with reference to FIG. 1, the data processing unit 108 of the communication unit 100 may receive the request to connect to a host device 116 via the legacy network interface 118. In some implementations, the data processing unit 108 can present itself, to the legacy network interface 118, as an access point to which client devices (and other access points) can connect. The data processing unit 108 may function as a virtual access point that periodically broadcasts beacon frames (or other periodic synchronization/monitoring messages) to advertise its existence. In one example, the data processing unit 108 may generate the beacon frames and the routing unit 104 may inject and provide the beacon frames, via the legacy network interface 118, for the host device 116 to process. The host device 116 can receive the beacon frames and may transmit a probe request frame, via the legacy network interface 118, in an attempt to connect to the data processing unit 108 functioning as a virtual access point. The flow continues at block 504.

At block 504, it is determined whether a connection with the legacy network interface should be established for communication using non-legacy communication protocols. For example, the routing unit 104 in conjunction with the conversion bridge 106 can determine whether the connection with the legacy network interface 118 should be established to transmit data (received from the legacy network interface 118) using one of the non-legacy communication protocols. In some implementations, prior to providing the probe request frame from the legacy network interface 118 to the data processing unit 108, the routing unit 104 can determine an operating mode of a host device 116 (that comprises the legacy network interface 118) and can determine whether subsequent packets received from the legacy network interface 118 should be transmitted using one of the non-legacy communication protocols. In another implementation, the routing unit 104 can determine whether packets received from the legacy network interface 118 should be transmitted using one of the non-legacy communication protocols based on an address of a destination network device, communication protocols supported at the destination network device, or other information included within the received packets. If it is determined that the connection with the legacy network interface 118 should be established for communication using non-legacy communication protocols, the routing unit 104 can determine that the subsequent packets from the legacy network interface 118 can be transmitted using the non-legacy communication protocol. The flow continues at block 506 where the routing unit 104 can cause the connection between the legacy network interface 118 and the data processing unit 108 to be established. If it is determined that the connection with the legacy network interface 118 should not be established, the flow continues at block 518.

At block 506, a connection with the legacy network interface is established. The flow 500 moves from block 504 to block 506 if the routing unit 104 determines that the connection with the legacy network interface 118 should be established for communication using non-legacy communication protocols. For example, the data processing unit 108 can establish a connection with the host device 116 via the legacy network interface 118. The data processing unit 108 and the host device 116 can exchange probe request/response frames, association request/response frames, authentication request/response frames to establish a communication link between the communication unit 100 and the host device 116 via the legacy network interface 118. In one implementation, the host device 116 can detect the beacon frame from the communication unit 100 and can transmit a broadcast probe request with an appropriate service set identifier (SSID). The data processing unit 108 can receive the broadcast probe request, can determine that the host device 116 is transmitting via the legacy network interface 118, and can transmit a probe response frame. In one example, the routing unit 104 can provide the probe request frame received from the legacy network interface 118 for subsequent processing by the communication unit 100. As will be described below, after the connection with the legacy network interface 118 is established, the routing unit 104 can intercept packets transmitted by the host device via the legacy network interface 118 and can provide the packets to the data processing unit 108 for transmission using the non-legacy communication protocol. The flow continues at block 508.

At block 508, a packet is received from the legacy network interface. For example, the data processing unit 108 can receive the packet from the legacy network interface 118 to be transmitted using a non-legacy communication protocol. As described above with reference to FIGS. 1-4, the conversion bridge 106 of the communication unit 100 can receive the PLCP header in the legacy PLCP header format 300, can convert the PLCP header to the intermediate PLCP header format 350 and can provide the PUT header in the intermediate PLCP header format 350 to the data processing unit 108 (via the routing unit 104). In one implementation, the conversion bridge 106 can also receive serial data from the legacy network interface 118, convert the serial data into parallel data, and provide the parallel data to the data processing unit 108 (via the routing unit 104). As will be described below, the data processing unit 108 can further format the parallel data for transmission using a non-legacy communication protocol. The flow continues at block 510.

At block 510, a route via which the packet is to be transmitted to the destination network device is determined. For example, the data processing unit 108 can determine the route via which the packet is to be transmitted to the destination network device based on the destination network device. The data processing unit 108 can determine the destination network device to which the packet (e.g., comprising the PLCP header and the parallel data) from the legacy network interface 118 is to be transmitted. The destination network device may be a remote/physical access point, an 802.11g/n client device, a WWAN device, etc. The data processing unit 108 can read a preamble of the packet (e.g., a destination address field) to determine the destination network device to which the packet is to be transmitted. The data processing unit 108 may implement any suitable routing algorithm to determine the route and the non-legacy communication protocol in accordance with which the packet should be transmitted to the destination network device. The data processing unit 108 may determine the route and the non-legacy communication protocol in accordance with which the packet should be transmitted based on the destination network device, based on the operating mode of the host device, etc. As will be described below with reference to blocks 512-516, depending on the non-legacy communication protocol selected for packet transmission, the data processing unit 108 can format the packet in accordance with the corresponding non-legacy packet format. The flow continues at block 512.

At block 512, it is determined whether the packet is to be transmitted using a non-legacy WLAN communication protocol. For example, based on the route determined at block 510, the data processing unit 108 can determine whether the packet is to be transmitted using the non-legacy WLAN (e.g., an 802.11g/n) communication protocol. As another example, the data processing unit 108 can determine whether the packet should be transmitted using the non-legacy WLAN communication protocol based on the address of the destination network device, communication protocols supported at the destination network device, or other information included within the received packet. As another example, the data processing unit 108 may determine whether the packet should be transmitted using the non-legacy WLAN communication protocol based on the operating mode of the host device. If it is determined that the packet is to be transmitted using the non-legacy WLAN communication protocol, the flow continues at block 514. Otherwise, the data processing unit 108 determines that the packet is to be transmitted using a WWAN communication protocol and the flow continues at block 516.

At block 514, the packet is translated into a non-legacy WLAN packet and the non-legacy WLAN packet is provided for transmission to the destination network device. For example, the data processing unit 108 can translate the packet from the intermediate packet format 350 to a non-legacy WLAN packet format to yield the non-legacy WLAN packet. The data processing unit 108 can cause the WLAN MAC 110 and the baseband/RF unit 112 to transmit the non-legacy WLAN packet using the non-legacy WLAN communication protocol, in one example, the data processing unit 108 can read the payload of the packet (received at block 508) and can encapsulate the payload of the packet with suitable WLAN headers to yield the non-legacy WLAN packet. In another example, the data processing unit 108 can encapsulate the PLCP header (in the intermediate PLCP header format 350) and the corresponding data (e.g., the parallel data) in a suitable non-legacy WLAN header to generate the non-legacy WLAN packet. The data processing unit 108 can also implement non-legacy security protocols, encryption, retransmission techniques, etc. to ensure reliability of data being transmitted from the communication unit 1100. In some implementations, operations for generating the non-legacy WLAN packet can be executed by the WLAN MAC 110 and/or the baseband/RF unit 112. From block 514, the flow ends.

At block 516, the packet is translated into a WWAN packet and the WWAN packet is provided for transmission to the destination network device. For example, the data processing unit 108 can translate the packet from the intermediate packet format to a WWAN packet format to yield the WWAN packet. The data processing unit 108 can cause the WWAN packet to be transmitted, via the WWAN interface 114, using the WWAN communication protocol. In one example, the data processing unit 108 can read the payload of the packet and can encapsulate the payload of the packet with suitable WWAN headers to yield the WWAN packet. In another example, the data processing unit 108 can encapsulate the PLCP header (in the intermediate PLCP header format 350) and the corresponding data (e.g., the parallel data) in a suitable WWAN header to generate the WWAN packet. The data processing unit 108 can also implement non-legacy security protocols, encryption, retransmission techniques, etc. to ensure reliability of data being transmitted from the communication unit 100.

In some implementations, operations for translating the packet into the WWAN packet can be executed by a distinct WWAN processing module (or by the WWAN interface 114).

The WWAN interface 114 can enable the communication unit 100 to communicate using the WWAN communication protocol. In one implementation, the WWAN packet can be transmitted using a communication network that supports Internet Protocol version 4 (IPv4). The WWAN interface 114 can comprise functionality for controlling WWAN setup (e.g., to establish and tear down a WWAN communication link), for transmitting data or receiving data in accordance with the WWAN communication protocol, etc. In one implementation, the WWAN interface 114 can provide Point-to-Point Protocol (PPP) functionality for establishing and negotiating PPP connections over a physical WWAN communication link. In other implementations, the WWAN interface can implement any suitable communication protocols for WWAN link control and data transfer. Furthermore, in some implementations, the data processing unit 108 can implement functionality for internet protocol network address translation (IP-NAT) to enable the packet provided by the legacy network interface 118 to be transmitted using the WWAN communication protocol. In another implementation, the data processing unit 108 can provide the WWAN packets to the WWAN interface 114, where the WWAN packets can undergo IP-NAT translation before being transmitted using the WWAN communication protocol. From block 516, the flow ends.

At block 518, subsequent packets received from the legacy network interface are transmitted using the legacy communication protocol. The flow 500 moves from block 504 to block 518 if the routing unit 104 determines that the connection with the legacy network interface 118 should not be established for communication using non-legacy communication protocols. The routing unit 104 may determine that the connection with the legacy network interface 118 should not be established based an operating mode of the host device. For example, the routing unit 104 may determine that a host gaming device is in a legacy gaming mode, that packets received from the host gaming device should be transmitting using legacy communication protocols, and that the connection with the legacy network interface 118 should not be established. From block 518, the flow ends.

Figure 6:
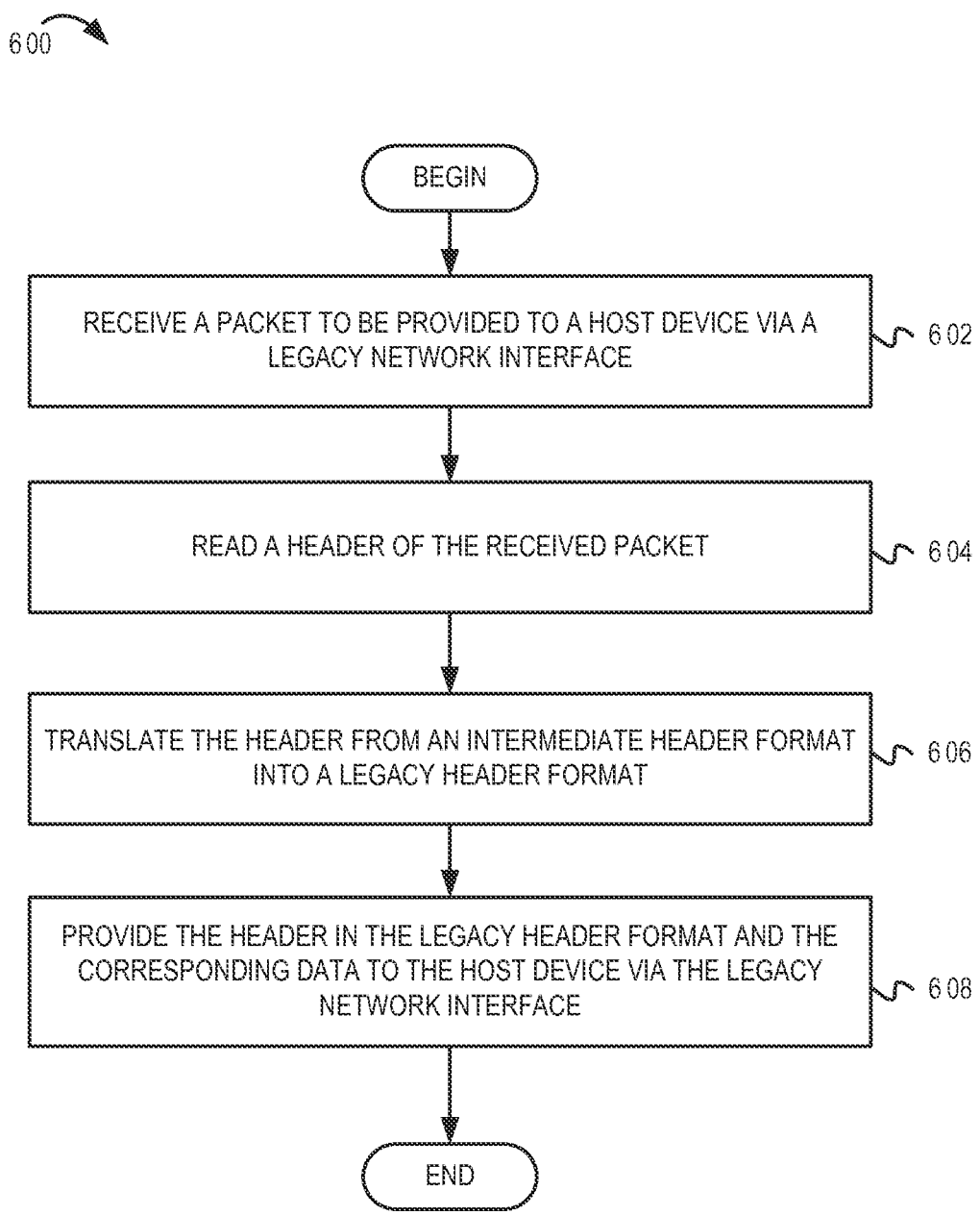
FIG. 6 is a flow diagram illustrating example operations for formatting a non-legacy network packet for transmission to a legacy network interface.

FIG. 6 is a flow diagram 600 illustrating example operations for formatting a non-legacy network packet for transmission to a legacy network interface. The flow 600 begins at block 602.

At block 602, a packet to be provided to a host device via a legacy network interface is received. The data processing unit 108 can receive the packet in a non-legacy packet format, using a non-legacy communication protocol, for transmission to the legacy network interface 118. For example, the data processing unit 108 can receive an 802.11g packet at a high data rate (e.g., 54 Mbps). To provide the 802.11g packet to the legacy network interface 118, the data processing unit 108 can re-encode the received 802.11g packet. In other words, the data processing unit 108 can convert some/all of the received 802.11g packet into an intermediate packet format that is recognized by the components of the communication unit 100. For example, the data processing unit 108 can convert the PLCP header of the received 802.11g packet into the intermediate header format 350 of FIG. 3. As will be described below, the conversion bridge 106 can then translate the packet from the intermediate packet format into a legacy packet format and can transmit the packet to the legacy network interface 118 at a slower legacy data rate (e.g., 1-2 Mbps). In one implementation, on receiving a WWAN packet, the WWAN interface 114 (or the data processing unit 108) can perform IP-NAT translations on the received WWAN packet before routing the translated packet to the legacy network interface 118 (e.g., via the conversion bridge 106). The flow continues at block 604.

At block 604, a header of the received packet is read. For example, the legacy mode conversion unit 2.10 of the conversion bridge 106 can read the PLCP header of the packet received at block 602. The PLCP header of the packet received from the routing unit 104 can be in the intermediate PLCP header format 350 of FIG. 3. The PLCP header may also be received from the routing unit 104 in a parallel format. The legacy mode conversion unit 210 can convert the PLCP header and subsequent data received from the routing unit 104 into a legacy format as will be described below. The flow continues at block 606.

At block 606, the header is translated from an intermediate header format to a legacy header format. For example, the legacy mode conversion unit 210 can convert the PLCP header read at block 604 from the intermediate PLCP header format 350 into the legacy PLCP header format 300. In some implementations, the legacy mode conversion unit 210 can also convert parallel data received from the routing unit 104 (and the processing unit 108) into corresponding serial data for transmission to the host device 116 via the legacy network interface 118. The flow continues at block 608.

At block 608, the header in the legacy header format and the corresponding data are provided to the host device via the legacy network interface. For example, the legacy mode conversion unit 210 can transmit the PLCP header in the legacy PLCP header format 300 and the corresponding data (determined at block 606) to the host device via legacy network interface 118. In one example, the legacy mode conversion unit 210 can first provide the header in the legacy header format 300 to the legacy network interface 118. In another implementation, the legacy mode conversion unit 210 can simultaneously provide the PLCP header in the legacy PLCP header format 300 and the corresponding data to the legacy network interface 118. From block 608, the flow ends.

It should be understood that the depicted diagrams (FIGS. 1-6) are examples meant to aid in understanding embodiments and should not be used to limit embodiments or limit scope of the claims. Embodiments may perform additional operations, fewer operations, operations in a different order, operations in parallel, and some operations differently. For example, although FIG. 5 describes the data processing unit 108 translating the packet to be transmitted into either a non-legacy WLAN packet or a WWAN packet, embodiments are not so limited. In some embodiments, operations for translating the packet to be transmitted into the WLAN packet or the WWAN packet may be executed by separate processing units. For example, on determining to transmit the packet using the non-legacy WLAN communication protocol at block 512, the data processing unit 108 can provide the packet to a WLAN module (e.g., the WLAN MAC 110 and/or the baseband unit 112). The WLAN module can generate the WLAN packet and can transmit the WLAN packet in accordance with the route determined at block 510. Likewise, on determining to transmit the packet using the WWAN communication protocol at block 512, the data processing unit 108 can provide the packet to a WWAN module (e.g., implemented as part of the WWAN interface 114 and/or a WWAN device coupled to USB). The WWAN module can generate the WWAN packet and can transmit the WWAN packet in accordance with the route determined at block 510. It is noted that in other embodiments, the data processing unit 108 can determine to transmit the packet received from the legacy network interface 118 using another suitable non-legacy communication protocol and can consequently reformat the packet in accordance with the appropriate protocols, packet formats, etc.

It is also noted that in some implementations, the WWAN interface 114 can enable communication via a universal serial bus (USB) connection and the WWAN communication protocol. For example, the WWAN interface 114 can act as a bridge between the communication unit 100 and a USB WWAN transceiver. The WWAN transceiver can then transmit/receive the WWAN packet via the WWAN communication network. In another implementation, WWAN circuitry (e.g., the WWAN transceiver) can be integrated within the communication unit 100 (or the host device 116). The WWAN interface 114 can act as a bridge between the communication unit 100 and the integrated WWAN circuitry.

In addition to reformatting the packet received from the legacy network interface 118 in accordance with the non-legacy communication protocol based on which the packet is to be transmitted, the data processing unit 108 can also implement advanced security protocols. After the non-legacy communication protocol is selected, the data processing unit 108 can negotiate security protocols to be implemented, exchange authentication messages, coordinate a shared secret, etc. For example, the legacy network interface 118 may implement legacy security protocols (e.g., Wired Equivalent Privacy (WEP)). The data processing unit 108 may, in addition to the legacy security protocols, also implement advanced security protocols (e.g., Wi-Fi Protected. Access (WPA), WPA2, etc.) to improve security of data transmissions. In some implementations, the data processing unit 108 can act as a virtual access point and as a proxy to a remote, physical access point. The data processing unit 108 operating as a proxy can enable the legacy network interface 118 to communicate (e.g., with non-legacy (or newer) access points) at higher data rates using advanced security protocols. In one example, the legacy network interface 118 may pass security settings to the proxy virtual access point so that a connection with the remote, physical access point can first be established. The proxy virtual access point may then create an open access point connection (e.g., an unsecure connection, a connection with minimal/negligible security) with the legacy network interface 118 and may maintain a secure connection with the remote, physical access point. The virtual proxy access point can enable communication between the legacy network interface 118 and the remote, physical access point even though the legacy network interface 118 may be unaware of the remote, physical access point and the advanced security protocols being implemented by the remote, physical access point.

Lastly, it is noted that in some implementations, the data processing unit 108 may not function as a virtual access point. Instead, the communication unit 100 may receive all packets transmitted by the host device 116 via the legacy network interface 118. As described above, the routing unit 104 may determine whether the received packet should be transmitted using a non-legacy communication protocol. Accordingly, the data processing unit 108 may route the packet received from the legacy network interface 118 using non-legacy WLAN protocols, WWAN protocols, or other suitable non-legacy communication protocols.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RE, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
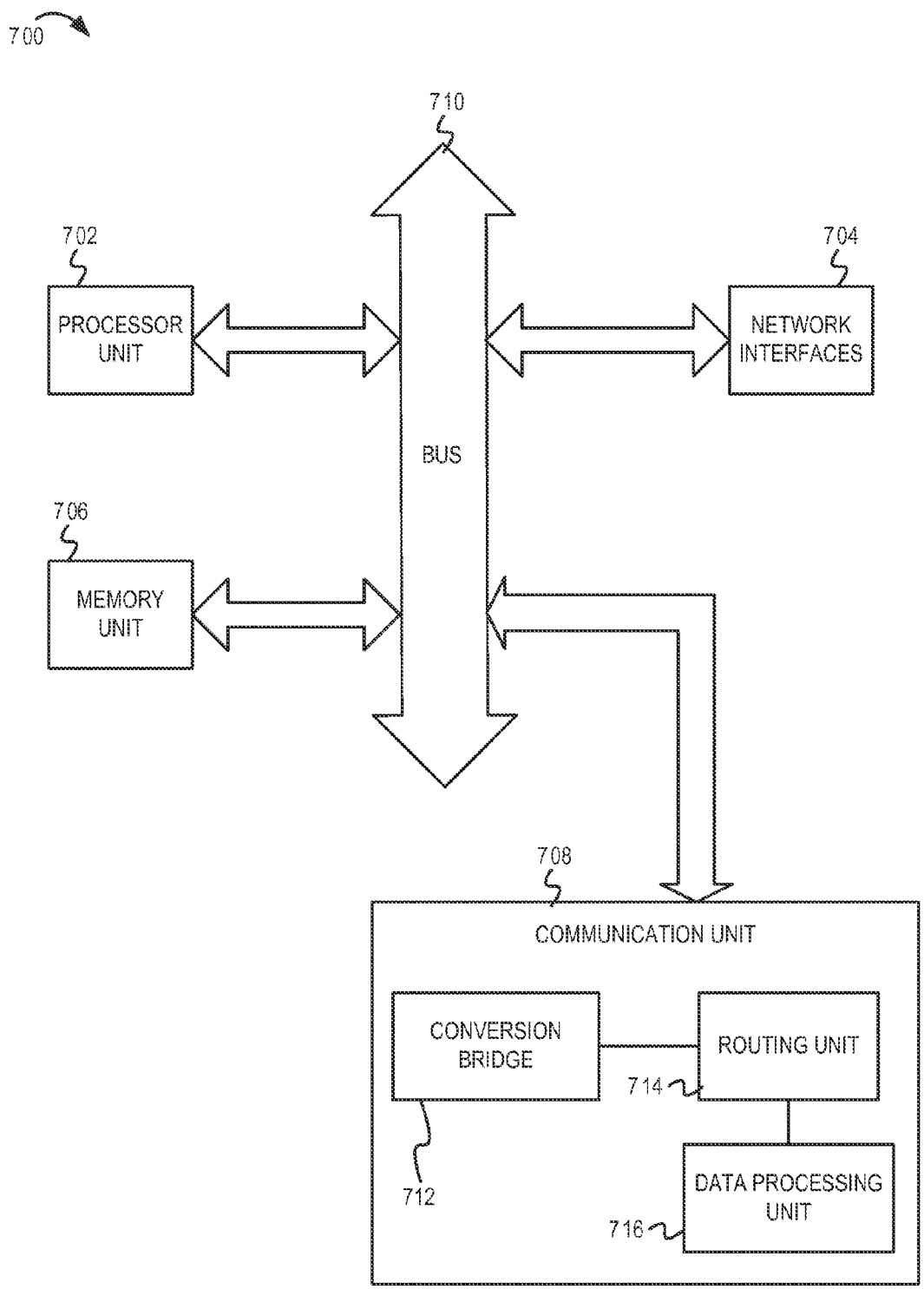
FIG. 7 is an electronic device including a mechanism for multi-communication mode packet routing for wireless communication systems.

FIG. 7 is a block diagram of one embodiment of an electronic device 700 including a mechanism for multi-communication mode packet routing for wireless communication systems. In some implementations, the electronic device 700 may be a laptop, a personal computer (PC), a netbook, a mobile phone, a gaming device, or other suitable electronic system with wireless communication capabilities. The electronic device 700 can be a network device that supports both legacy and non-legacy communication protocols. A communication unit 708 of the electronic device 700 can receive data via a legacy network interface and can process and transmit the data using a non-legacy communication protocol at faster data transmission rates. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, an ATM interface, a Frame Relay interface, a SONET interface, etc.).

The communication unit 708 of the electronic device 700 comprises a conversion bridge 712, a routing unit 714, and a data processing unit 716. As described herein with reference to FIG. 16, the communication unit 708 can implement functionality to identify a non-legacy communication protocol based on which packets from a legacy network interface can be transmitted. The communication unit 708 can convert packets from a legacy packet format into a suitable non-legacy packet format and can transmit the packets using the selected non-legacy communication protocol. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, storage devices, etc.). The processor unit 702, the memory unit 706, and the network interfaces 706 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, for a multi-communication mode packet routing mechanism for wireless communication systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving, at a network communication device, a packet in a legacy packet format from a host device via a legacy network interface for transmission to a destination network device;
determining whether the packet received at the network communication device via the legacy network interface is to be transmitted using a legacy communication protocol or a non-legacy communication protocol of a plurality of non-legacy communication protocols based, at least in part, on a portion of content in a payload of the packet;
in response to determining the packet is to be transmitted using the non-legacy communication protocol based, at least in part, on the portion of the content in the payload of the packet,
determining a processing path within the network communication device in accordance with which to process the packet for transmission using the non-legacy communication protocol; and
reformatting the packet in the legacy packet format to yield a target packet in a non-legacy packet format based, at least in part, on the non-legacy communication protocol; and
transmitting the target packet to the destination network device in accordance with the non-legacy communication protocol.

2. The method of claim 1, further comprising:
intercepting, at the network communication device, the packet received in the legacy packet format from the host device via the legacy network interface; and
determining the portion of the content in the payload of the packet based, at least in part, on the packet in the legacy packet format received from the host device.

3. The method of claim 1, further comprising:
determining, at the network communication device, that the packet is not to be transmitted using the non-legacy communication protocol based, at least in part, on the portion of the content in the payload of the packet; and
directly transmitting the packet to the destination network device in accordance with the legacy communication protocol.

4. The method of claim 1,
wherein the legacy communication protocol comprises an Institute of Electrical and Electronics Engineers (IEEE) 802.11b communication protocol, and
wherein the non-legacy communication protocol comprises one of an IEEE 802.11n communication protocol, an IEEE 802.11g communication protocol, and a wireless wide area network (WWAN) communication protocol.

5. The method of claim 1, wherein said determining the processing path in accordance with which to process the packet for transmission using the non-legacy communication protocol further comprises:
determining the non-legacy communication protocol of the plurality of non-legacy communication protocols in accordance with which to perform said reformatting the packet in the legacy packet format to yield the target packet in the non-legacy packet format that corresponds to the non-legacy communication protocol; and
determining the processing path within the network communication device based, at least in part, on at least one of the non-legacy communication protocol associated with the portion of the content in the payload of the packet and an address of the destination network device.

6. The method of claim 1, further comprising:
translating the packet received via the legacy network interface from the legacy packet format into an intermediate packet format associated with the network communication device.

7. The method of claim 6, wherein said reformatting the packet in the legacy packet format to yield the target packet in the non-legacy packet format further comprises:

identifying the non-legacy communication protocol in accordance with which to process the packet for transmission using the non-legacy communication protocol; and converting the packet from the intermediate packet format associated with the network communication device into the non-legacy packet format that corresponds to the non-legacy communication protocol to yield the target packet.

8. The method of claim 1, further comprising:

receiving, at the network communication device, a second packet in the non-legacy packet format that corresponds to the non-legacy communication protocol for transmission to the host device via the legacy network interface;

reformatting the second packet in the non-legacy packet format to yield a second target packet in the legacy packet format; and transmitting the second target packet in the legacy packet format to the host device via the legacy network interface.

9. The method of claim 1, wherein said determining whether the packet received via the legacy network interface is to be transmitted using the legacy communication protocol or the non-legacy communication protocol further comprises:

in response to determining that the packet received via the legacy network interface is to be transmitted using the legacy communication protocol,
selecting the legacy communication protocol for subsequent communication between the network communication device and the destination network device; and in response to determining that the packet received via the legacy network interface is to be transmitted using the non-legacy communication protocol of the plurality of non-legacy communication protocols,
determining one or more of the plurality of non-legacy communication protocols supported at the destination network device based, at least in part, on an address of the destination network device; and
selecting a first of the one or more of the plurality of non-legacy communication protocols for subsequent communication between the network communication device and the destination network device.

10. The method of claim 1, wherein the portion of the content in the payload of the packet comprises at least one of voice communication data and gaming data.

11. The method of claim 1, wherein determining whether the packet received at the network communication device via the legacy network interface is to be transmitted using the legacy communication protocol or the non-legacy communication protocol based, at least in part, on the portion of the content in the payload of the packet comprises:

sniffing the packet to determine a type of data in a payload of the packet; and determining whether the packet received at the network communication device via the legacy network interface is to be transmitted using the legacy communication protocol or the non-legacy communication protocol of the plurality of non-legacy communication protocols based, at least in part, on the type of data in the payload of the packet.

12. The method of claim 1, wherein determining whether the packet received at the network communication device via the legacy network interface is to be transmitted using the legacy communication protocol or the non-legacy communication protocol comprises:

determining whether the packet received at the network communication device via the legacy network interface is to be transmitted using the legacy communication protocol or the non-legacy communication protocol based, at least in part, on a portion of a type of data in the payload of the packet.

13. A network communication device comprising:

a conversion bridge operable to:
receive a packet in a legacy packet format from a host device via a legacy network interface for transmission to a destination network device;

a routing unit operable to:
determine whether the packet received at the network communication device via the legacy network interface is to be transmitted using a legacy communication protocol or a non-legacy communication protocol of a plurality of non-legacy communication protocols based, at least in part, on a portion of the content in the payload of the packet; and a data processing unit operable to:
in response to determination that the packet is to be transmitted using the non-legacy communication protocol based, at least in part, on the portion of the content in the payload of the packet,
determine a processing path within the network communication device in accordance with which to process the packet for transmission using the non-legacy communication protocol in response to the routing unit determining the packet is to be transmitted using the non-legacy communication protocol; and
reformat the packet in the legacy packet format to yield a target packet in a non-legacy packet format based, at least in part, on the non-legacy communication protocol; and
transmit the target packet to the destination network device in accordance with the non-legacy communication protocol.

14. The network communication device of claim 13, wherein the routing unit is further operable to:

intercept the packet received in the legacy packet format from the host device via the legacy network interface; and determine the portion of the content in the payload of the packet based, at least in part, on the packet in the legacy packet format received from the host device.

15. The network communication device of claim 13, wherein the routing unit is further operable to:

determine that the packet is not to be transmitted using the non-legacy communication protocol based, at least in part, on the portion of the content in the payload of the packet; and directly provide the packet to the destination network device in accordance with the legacy communication protocol.

16. The network communication device of claim 13, wherein the data processing unit operable to determine the processing path in accordance with which to process the packet for transmission using the non-legacy communication protocol further comprises the data processing unit operable to:

determine the non-legacy communication protocol of the plurality of non-legacy communication protocols in accordance with which to reformat the packet in the legacy packet format to yield the target packet in the non-legacy packet format that corresponds to the non-legacy communication protocol; and determine the processing path within the network communication device based, at least in part, on at least one of the non-legacy communication protocol associated with the portion of the content in the payload of the packet and an address of the destination network device.

17. The network communication device of claim 13, wherein the conversion bridge is further operable to:
    translate the packet received via the legacy network interface from the legacy packet format into an intermediate packet format associated with the communication device.

18. The network communication device of claim 17, wherein the data processing unit operable to reformat the packet in the legacy packet format to yield the target packet in the non-legacy packet format further comprises the data processing unit operable to:
    identify the non-legacy communication protocol in accordance with which to process the packet for transmission using the non-legacy communication protocol; and
    convert the packet from the intermediate packet format associated with the communication device into the non-legacy packet format that corresponds to the non-legacy communication protocol to yield the target packet.

19. The network communication device of claim 13, wherein the conversion bridge is further operable to:
    receive a second packet in the non-legacy packet format that corresponds to the non-legacy communication protocol for transmission to the host device via the legacy network interface;
    reformat the second packet in the non-legacy packet format to yield a second target packet in the legacy packet format; and
    transmit the second target packet in the legacy packet format to the host device via the legacy network interface.

20. The network communication device of claim 13, wherein the routing unit operable to determine whether the packet received via the legacy network interface is to be transmitted using the legacy communication protocol or the non-legacy communication protocol further comprises the routing unit operable to:
    in response to determining that the packet received via the legacy network interface is to be transmitted using the legacy communication protocol,
        select the legacy communication protocol for subsequent communication between the network communication device and the destination network device; and
    in response to determining that the packet received via the legacy network interface is to be transmitted using the non-legacy communication protocol of the plurality of non-legacy communication protocols,
        determine one or more of the plurality of non-legacy communication protocols supported at the destination network device based, at least in part, on an address of the destination network device; and
        select a first of the one or more of the plurality of non-legacy communication protocols for subsequent communication between the network communication device and the destination network device.

21. The network communication device of claim 13, wherein the portion of the content in the payload of the packet comprises at least one of voice communication data and gaming data.

22. The network communication device of claim 13, wherein as part of determination of whether the packet at the network communication device via the legacy network interface is to be transmitted using the legacy communication protocol or the non-legacy communication protocol based, at least in part, on the portion of the content in the payload of the packet, the routing unit is operable to:
    sniff the packet to determine a type of data in a payload of the packet; and
    determine whether the packet received at the network communication device via the legacy network interface is to be transmitted using the legacy communication protocol or the non-legacy communication protocol of the plurality of non-legacy communication protocols based, at least in part, on the type of data in the payload of the packet.

23. The network communication device of claim 13, wherein the routing unit operable to determine whether the packet received at the network communication device via the legacy network interface is to be transmitted using the legacy communication protocol or the non-legacy communication protocol comprises:
    the routing unit operable to determine whether the packet received at the network communication device via the legacy network interface is to be transmitted using the legacy communication protocol or the non-legacy communication protocol based, at least in part, on a portion of a type of data in the payload of the packet.

24. A system comprising:
    a host device configured to operate in one of a plurality of operational modes to communicate via a communication network;
    a communication unit coupled with the host device, wherein the host device is to communicate via the communication network through the communication unit, the communication unit comprising:
        a conversion bridge coupled with the host device, the conversion bridge operable to:
            receive a packet in a legacy packet format from the host device via a legacy network interface for transmission to a destination network device;
        a routing unit operable to:
            intercept the packet received in the legacy packet format from the host device via the legacy network interface;
            determine a portion of the content in the payload of the packet based, at least in part, on the packet in the legacy packet format received from the host device;
            determine whether the packet via the legacy network interface is to be transmitted using a legacy communication protocol or a non-legacy communication protocol of a plurality of non-legacy communication protocols based, at least in part, on the portion of the content in the payload of the packet; and
        a data processing unit operable to:
            in response to determination that the packet is to be transmitted using the non-legacy communication protocol based, at least in part, on the portion of the content in the payload of the packet,
                determine a processing path within the communication unit in accordance with which to process the packet for transmission using the non-legacy communication protocol in response to the routing unit determining the packet is to be transmitted using the non-legacy communication protocol; and
                reformat the packet in the legacy packet format to yield a target packet in a non-legacy packet format based, at least in part, on the non-legacy communication protocol; and transmit the target packet to the destination network device in accordance with the non-legacy communication protocol.

25. The system of claim 24, wherein the routing unit is further operable to:
determine that the packet is not to be transmitted using the non-legacy communication protocol based, at least in part, on the portion of the content in the payload of the packet; and
directly transmit the packet to the destination network device in accordance with the legacy communication protocol.

26. The system of claim 24, wherein the data processing unit operable to determine the processing path in accordance with which to process the packet for transmission using the non-legacy communication protocol further comprises the data processing unit operable to:
determine the non-legacy communication protocol of the plurality of non-legacy communication protocols in accordance with which to reformat the packet in the legacy packet format to yield the target packet in the non-legacy packet format that corresponds to the non-legacy communication protocol; and
determine the processing path within the communication unit based, at least in part, on at least one of the non-legacy communication protocol associated with the portion of the content in the payload of the packet and an address of the destination network device.

27. The system of claim 24, wherein the conversion bridge is further operable to:
translate the packet received via the legacy network interface from the legacy packet format into an intermediate packet format associated with the communication unit.

28. The system of claim 27, wherein the data processing unit operable to reformat the packet in the legacy packet format to yield the target packet in the non-legacy packet format further comprises the data processing unit operable to:
identify the non-legacy communication protocol in accordance with which to process the packet for transmission using the non-legacy communication protocol; and
convert the packet from the intermediate packet format associated with the communication unit into the non-legacy packet format that corresponds to the non-legacy communication protocol to yield the target packet.

29. The system of claim 24, wherein the portion of the content in the payload of the packet comprises at least one of voice communication data and gaming data.

30. The system of claim 24, wherein as part of determination of whether the packet via the legacy network interface is to be transmitted using the legacy communication protocol or the non-legacy communication protocol based, at least in part, on the portion of the content in the payload of the packet, the routing unit is operable to:
sniff the packet to determine a type of data in a payload of the packet; and
determine whether the packet received via the legacy network interface is to be transmitted using the legacy communication protocol or the non-legacy communication protocol of the plurality of non-legacy communication protocols based, at least in part, on the type of data in the payload of the packet.

31. The system of claim 24, wherein the routing unit operable to determine whether the packet received at the network communication device via the legacy network interface is to be transmitted using the legacy communication protocol or the non-legacy communication protocol comprises:
the routing unit operable to determine whether the packet received at the network communication device via the legacy network interface is to be transmitted using the legacy communication protocol or the non-legacy communication protocol based, at least in part, on a portion of a type of data in the payload of the packet.

* * * * *